(12) United States Patent
Smith

(10) Patent No.: US 7,554,975 B2
(45) Date of Patent: Jun. 30, 2009

(54) PROTOCOL AGNOSTIC SWITCHING

(75) Inventor: Alexander A. Smith, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 807 days.

(21) Appl. No.: 11/171,858

(22) Filed: Jun. 30, 2005

(65) Prior Publication Data

US 2007/0002854 A1    Jan. 4, 2007

(51) Int. Cl.
*H04L 12/56* (2006.01)
*H04J 1/16* (2006.01)

(52) U.S. Cl. .................. 370/369; 370/468; 370/476

(58) Field of Classification Search ............ 370/252, 370/428, 395.53, 386, 369, 468, 476, 470, 370/472

See application file for complete search history.

(56) References Cited

U.S. PATENT DOCUMENTS

| | | | |
|---|---|---|---|
| 6,463,063 B1* | 10/2002 | Bianchini et al. | 370/395.53 |
| 2003/0189947 A1* | 10/2003 | Beshai | 370/428 |
| 2004/0047367 A1* | 3/2004 | Mammen | 370/472 |

\* cited by examiner

*Primary Examiner*—John Pezzlo
(74) *Attorney, Agent, or Firm*—Caven & Aghevli LLC

(57) ABSTRACT

In one embodiment, an apparatus comprises a switch fabric, an adaptation processor to append a length field to a received packet, and a switch fabric to use information in the length field to switch variable-sized packets.

21 Claims, 8 Drawing Sheets

PROTOCOL AGNOSTIC SWITCHING

BACKGROUND

The subject matter described herein relates generally to the field of electronic communication and more particularly to protocol agnostic switching.

Communication networks transmit data from a source to a destination via a communication network. Some communication networks implement multiple "overlay" networks to manage circuit-switched communication and packet-switched communication. Overlay networks increase transmission overhead and network operating costs.

BRIEF DESCRIPTION OF THE DRAWINGS

The detailed description is described with reference to the accompanying figures.

DETAILED DESCRIPTION

Described herein are exemplary systems and methods for protocol agnostic switching in a communication system. In the following description, numerous specific details are set forth in order to provide a thorough understanding of various embodiments. However, it will be understood by those skilled in the art that the various embodiments may be practiced without the specific details. In other instances, well-known methods, procedures, components, and circuits have not been described in detail so as not to obscure the particular embodiments.

The methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods.

Figure 1:
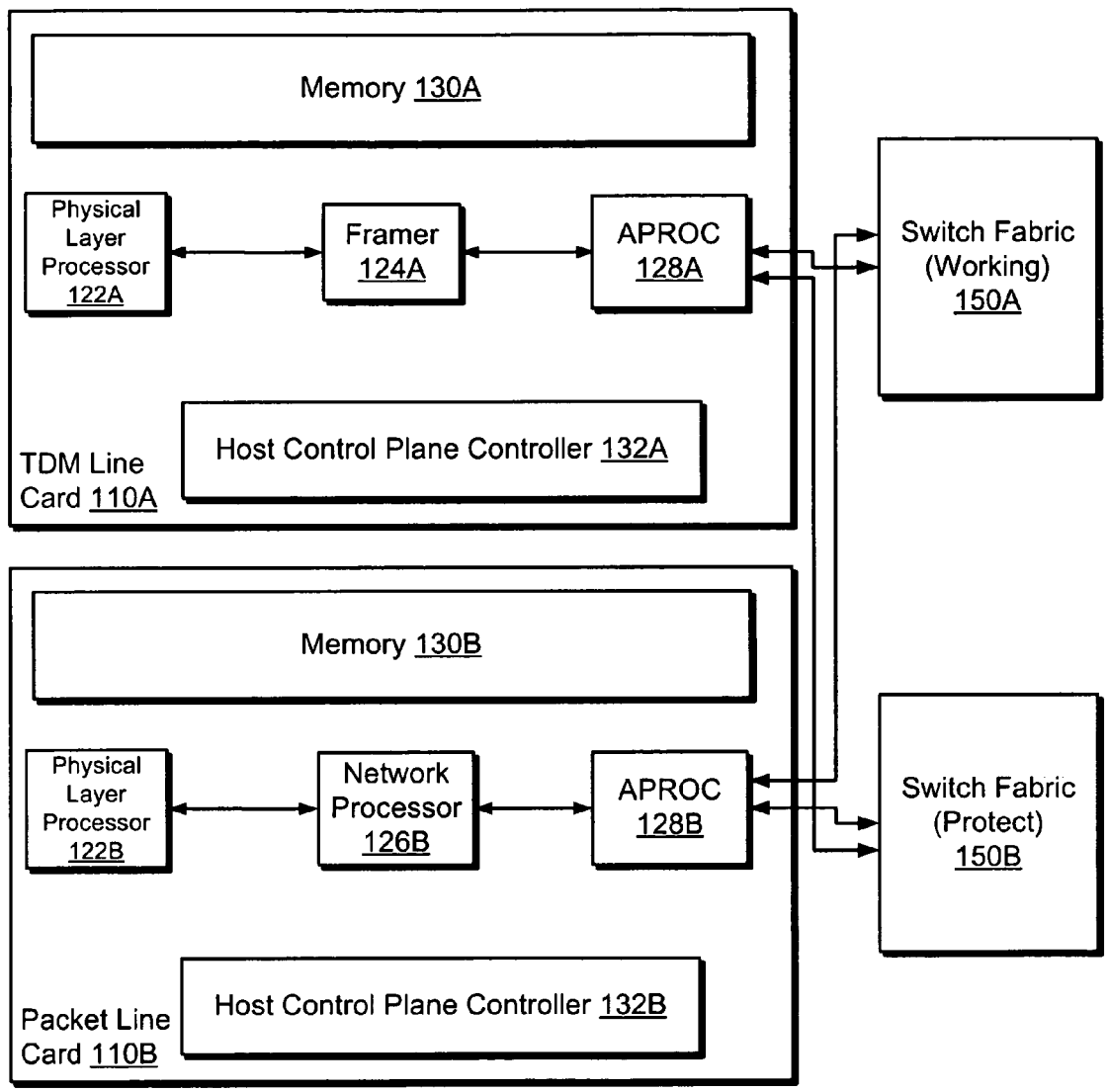
FIG. 1 is a schematic illustration of a switching system in accordance with one embodiment.

FIG. 1 is a schematic illustration of a switching system 100 in accordance with one embodiment. The system 100 may include a first line card 110A for processing time division multiplexed (TDM) traffic and a second line card 110B for processing packet-switched traffic. System 100 may further include a working switch fabric 150A and a backup, or "protect" switch fabric 150B. In one embodiment, both the working and the switch fabrics may be active concurrently.

Line card 110A may be implemented as a transceiver capable of transmitting and receiving frames and/or packets to and from a network that is compatible with any TDM switching protocol such as, e.g., SONET/SDH OTN, TFI-5, and Ethernet, and the like. For example, SONET/SDH and OTN are described in: ITU-T Recommendation G.709 Interfaces for the optical transport network (OTN) (2001); ANSI T1.105, Synchronous Optical Network (SONET) Basic Description Including Multiplex Structures, Rates, and Formats; Bellcore Generic Requirements, GR-253-CORE, Synchronous Optical Network (SONET) Transport Systems: Common Generic Criteria (A Module of TSGR, FR-440), Issue 1, December 1994; ITU Recommendation G.872, Architecture of Optical Transport Networks, 1999; ITU Recommendation G825, "Control of Jitter and Wander within Digital Networks Based on SDH" March, 1993; ITU Recommendation G.957, "Optical Interfaces for Equipment and Systems Relating to SDH", July, 1995; ITU Recommendation G.958, Digital Line Systems based on SDH for use on Optical Fibre Cables, November, 1994; and/or ITU-T Recommendation G.707, Network Node Interface for the Synchronous Digital Hierarchy (SDH) (1996). For example, an implementation of TFI-5 is described in TFI-5: TDM Fabric to Framer Interface Implementation Agreement (2003) available from the Optical Internetworking Forum (OIF). For example, IEEE 802.3 describes Ethernet standards.

SONET/SDH defines optical carrier levels and electrically equivalent synchronous transport signals (STSs) for the fiber-optic based hierarchy. In SONET, any type of service, ranging from voice to high speed data and video, may be accepted by various types of service adapters. A service adapter maps the signal into the payload envelope of the STS-1 or virtual tributary. All inputs received are converted to a base format of a synchronous signal, referred to as STS-1, which transmits at 51.84 Mbps (or higher). Several synchronous STS-1s may be multiplexed together to form a higher-level STS-n signal, which are integer multiples of an STS-1 signal.

One embodiment of line card 110A may include physical layer processor 122A, framer 124A and an adaptation processor (APROC) 128A, a memory module 130A, and host-control plane controller 132A. The various components of line card 110A may be coupled by suitable communication links such as, e.g., one or more communication busses or point-to-point communication links.

Physical layer processor 122A may receive optical or electrical signals from the network and prepare the signals for processing by downstream elements. For example, for frames received from the network, physical layer processor 122A may convert an optical signal to electrical format and/or remove jitter from signals from the network. For frames to be transmitted to the network, physical layer processor 122A may remove jitter from signals provided by upstream devices such as framer 124A and prepare signals for transmission to the network, which may be in optical or electrical format.

Framer 124A may utilize techniques described herein to process frames and/or packets received from a network.

Framer 124A may transfer overhead from frames and/or packets to a processor APROC 128A. For example, framer 124A and APROC 128A may communicate using an interface compatible for example with SPI-4 (described for example in the Optical Internetworking Forum (OIF Document) OIF-SPI4-02.1 and ITU-T G.707 2000, T1.105-2001 (draft), T1.105.02-1995, and ITU-T recommendations G.7042 and G.707), although interfaces compatible with other standards may be used.

Host-control plane controller 132A may configure operation of framer 124A and APROC 128A. For example, host-control plane controller 132A may program/provision framer 124A to control the content of frames. In one embodiment, host-control plane controller 128A may be implemented as a separate and communicate with the framer 124A and APROC 128A using an interface that complies with Peripheral Component Interconnect (PCI) Local Bus Specification, Revision 2.2, Dec. 18, 1998 available from the PCI Special Interest Group, Portland, Oreg., U.S.A. (as well as revisions thereof) or PCI-X Specification Rev. 1.0a, Jul. 24, 2000, available from the aforesaid PCI Special Interest Group, Portland, Oreg., U.S.A., although other standards may be used. In alternate embodiments, host-control plane controller 132A could be implemented as part of APROC 128A, although other implementations may be used.

In one embodiment, one or more of physical layer processor 122A, framer 124A, or APROC 128A may be coupled to volatile and/or nonvolatile memory module 130A. For example, memory module 130A may include one or more of the following: read-only memory (ROM), programmable ROM (PROM), erasable PROM (EPROM), electrically EPROM (EEPROM), a disk drive, a floppy disk, a compact disk ROM (CD-ROM), a digital video disk (DVD), flash memory, a magneto-optical disk, or other types of nonvolatile machine-readable media suitable for storing electronic instructions and/or data.

In one embodiment, components of TDM line card 110A may be implemented in/on the same integrated circuit device or chip or die. In another embodiment, components of TDM line card 110A may be implemented among several integrated circuits that communicate using, for example, a bus or conductive leads of a printed circuit board.

In one embodiment, packet line card 110B may include a physical layer processor 122B, a network processor 126B, an APROC 128B, a memory module 130B, and a host plane controller 132B.

Network processor 126B may perform layer 2 and/or layer 3 (as well as other higher layer level) processing on frames and/or packets provided by and to physical layer processor 122B in conformance with applicable link, network, transport and application protocols. Network processor 126A also may perform traffic management at the IP layer. The remaining components of packet line card 122B may be analogous to the components are described above.

Switch fabrics 150A, 150B may be implemented as a single-chip switching fabric that supports switching of variable-sized packets. A communication interface between adaptation processors 128A, 128B and switch fabrics 150A, 150B may be implemented over a suitable high-speed interface such as, e.g., a SERDES (Serializer/Deserializer) interface. In one embodiment the communication interface may be is request-less in that it does not require request and/or acknowledgment interaction between the adaptation processors 128A, 128B and the switch fabrics 150A, 150B.

Figure 2:
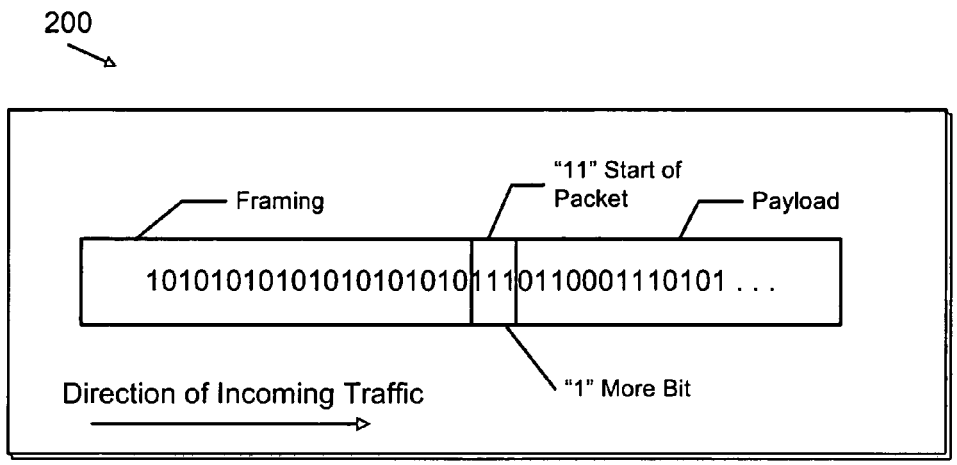
FIG. 2 is a schematic illustration of a data stream in accordance with one embodiment.

The communication interface may be explained in greater detail with reference to FIGS. 2-3. FIG. 2 is a schematic illustration of a data stream in the communication interface between adaptation processor 128A, 128B and switch fabric 150A, 150B in accordance with one embodiment. Referring to FIG. 2, when there is no traffic to send, an alternating pattern of "0" and "1" are transmitted across the interface. The adaptation processor 128A, 128B and the switch fabric 150A, 150B monitor the data stream for a "11," which indicates the start of a packet (SOP).

Figure 3:
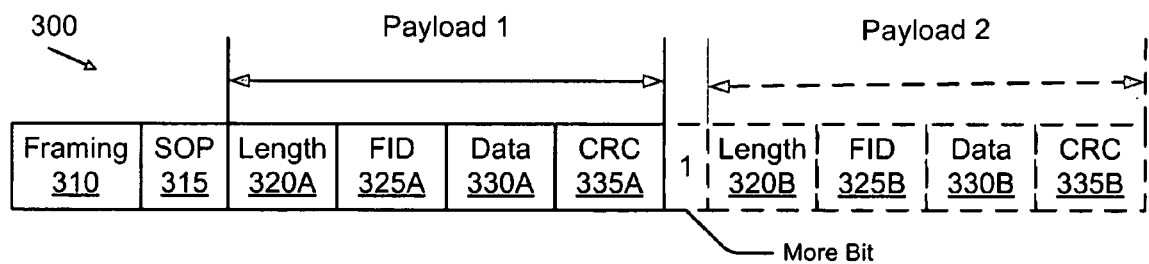
FIG. 3 is a schematic illustration of a frame architecture in accordance with one embodiment.

FIG. 3 is a schematic illustration of a frame architecture which may be used in the communication interface between an adaptation processor 128A, 128B and switch fabric 150A, 150B in accordance with one embodiment. Referring to FIG. 3, a frame architecture 200 includes a framing field 310, a start of packet (SOP) field 315, and a payload section. The payload section of the frame architecture includes a length field 320 that indicates the length of the data field 330, and a FID field 325 that includes an identifier associated with a data stream with which the data field 330 is associated. The data field 330 may be variable in length. The CRC field 335 includes a CRC value associated with the data frame.

The SOP field includes an identifier that indicates the start of a packet. In one embodiment, a "11" is used to indicate the start of a packet. In one embodiment, the SOP field includes an additional field, referred to as a "more" bit. When the more bit is set it indicates that there will be another payload following the current payload. In the embodiment depicted in FIG. 2, the first payload includes fields 320A-335A and second payload field includes payload fields 320A-335B. More or fewer payload sections may be transmitted. The second payload field is preceded by a single "more" bit.

Figures 4A, 4B:
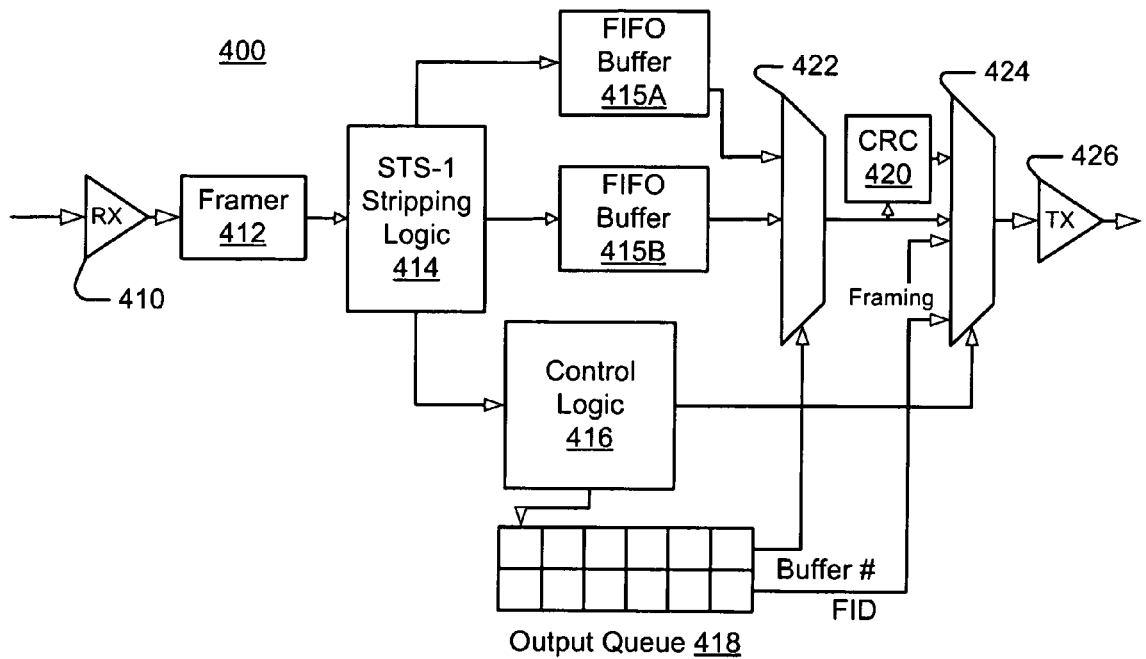
FIG. 4A is a schematic block diagram of ingress logic of an adaptation processor adapted to operate in a TDM environment, in accordance with an embodiment.
FIG. 4B is a schematic block diagram of ingress logic of an adaptation processor adapted to operate in a packet-switched environment, in accordance with an embodiment.
Figure 7A:
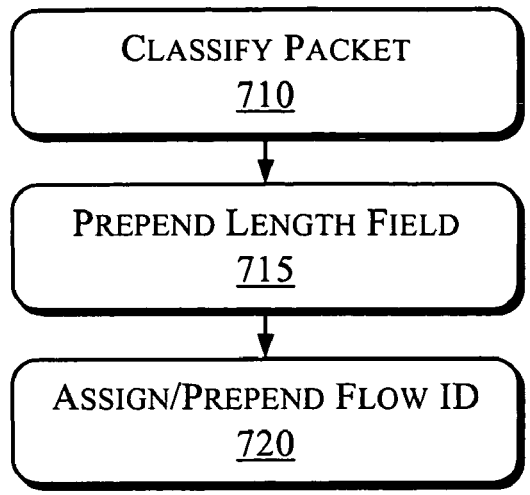
FIG. 7A is a flowchart illustrating operations in a method for preprocessing data frames in accordance with an embodiment.
Figure 7B:
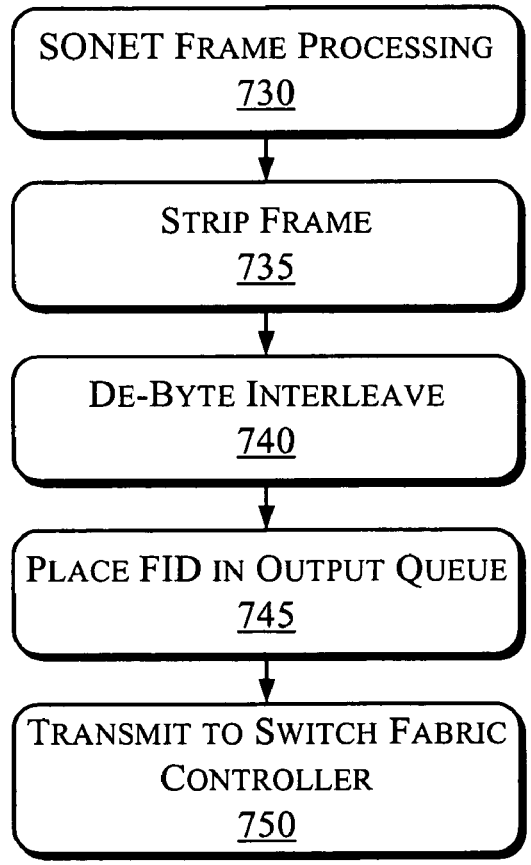
FIG. 7B is a flowchart illustrating operations in a method for processing data frames in accordance with an embodiment.

Ingress processing for TDM operation will be explained with referenced to FIGS. 4A, and 7B. FIG. 4A is a schematic block diagram of ingress logic of an adaptation processor 400 adapted to operate in a TDM environment, in accordance with an embodiment. FIG. 7B is a flowchart illustrating operations in a method for processing data frames in accordance with an embodiment. In one embodiment, adaptation processor 400 may correspond to adaptation processor 128A.

Referring to FIG. 4A, adaptation processor 400 includes a receiver 410 to receive a TDM stream from a network. In one embodiment, receiver 410 includes an input/output port that receives data from a SONET network. Receiver 410 may be coupled to a framing module 412 that recognizes the SONET A1A2 framing structure and performs SONET frame processing (operation 730) on received data frames. Stripping logic 414 strips SONET headers from the frame (operation 735) and, in one embodiment, also debyte interleaves STS-1 payloads (operation 740), which may be placed into a memory buffer 415A, 415B for each STS-1.

Control logic 416 (which may be associated with stripping logic 414) has a flow identifier (FID) for each STS-1 in the SONET frame in the FID table. In one embodiment, the FID and an identifier of the memory buffer 415A, 415B into which the received bytes were written are entered in a FID Table. In one embodiment, control logic 416 maintains a table that associates FIDs with the location(s) of associated data streams in the memory buffers 415A, 415B. Control logic 416 places FIDs into an output queue 418 (operation 745) along with the buffer number, which is apointer to the FIFO containing the STS-1 to be transmitted.

FIDs in the output queue are switched through multiplexer 424 to transmitter 426 for transmission to a switch fabric such as, e.g., switch fabric 150A (operation 750). When the FID is passed to the multiplexer 424, the data stream(s) associated with the FID are retrieved from a memory buffer 415A, 416B and transmitted with the FID, along with a length parameter associated with the data stream. An error-checking routine such as a CRC 420 may be calculated and transmitted with the FID and the associated data.

Ingress processing in a packet-switched line card 110B is explained with reference to FIGS. 4B and 7A. FIG. 7A is a flowchart illustrating operations in a method for preprocessing data frames. The operations illustrated in FIG. 7A may be performed by the adaptation processor 128B, the network processor 126B, and/or another processing component associated with packet line card 110B.

Referring first to FIG. 7A, at operation 710 a received packet is classified. At operation 715 a length field is prepended to the packet. In one embodiment the length field identifies the length of the payload section of the data frame. At operation 720 a flow identifier is assigned to the data flow and prepended to the data packet, or is programmed into the FID table of the APROC. The pre-processed packet is then forwarded to the adaptation processor 128A.

FIG. 4B is a schematic block diagram of ingress logic of an adaptation processor 450 adapted to operate in a packet-switched environment, in accordance with an embodiment. Referring to FIG. 4B, adaptation processor 400 includes a receiver 460 to receive data packets (or frames) from a network. In one embodiment, receiver 460 includes an input/output port that receives data packets from a packet-switched network. Receiver 460 may be coupled to a memory buffer 462 and control logic 466.

In one embodiment, received data packets may be stored temporarily in memory buffer 462. Control logic 416 writes the FID and an identifier of the memory buffer 415A, 416B into which the received bytes were written are entered into a FID Table. When a packet is transmitted from memory buffer 462, control logic 466 may output a length parameter that indicates the length of the packet and the FID associated with the packet. A CRC module 468 may calculate the CRC of output from memory buffer 462. The packet, the length parameter, the CRC, and framing information are input to multiplexer 470, which outputs the multiplexed data to transmitter 472.

Figure 8:
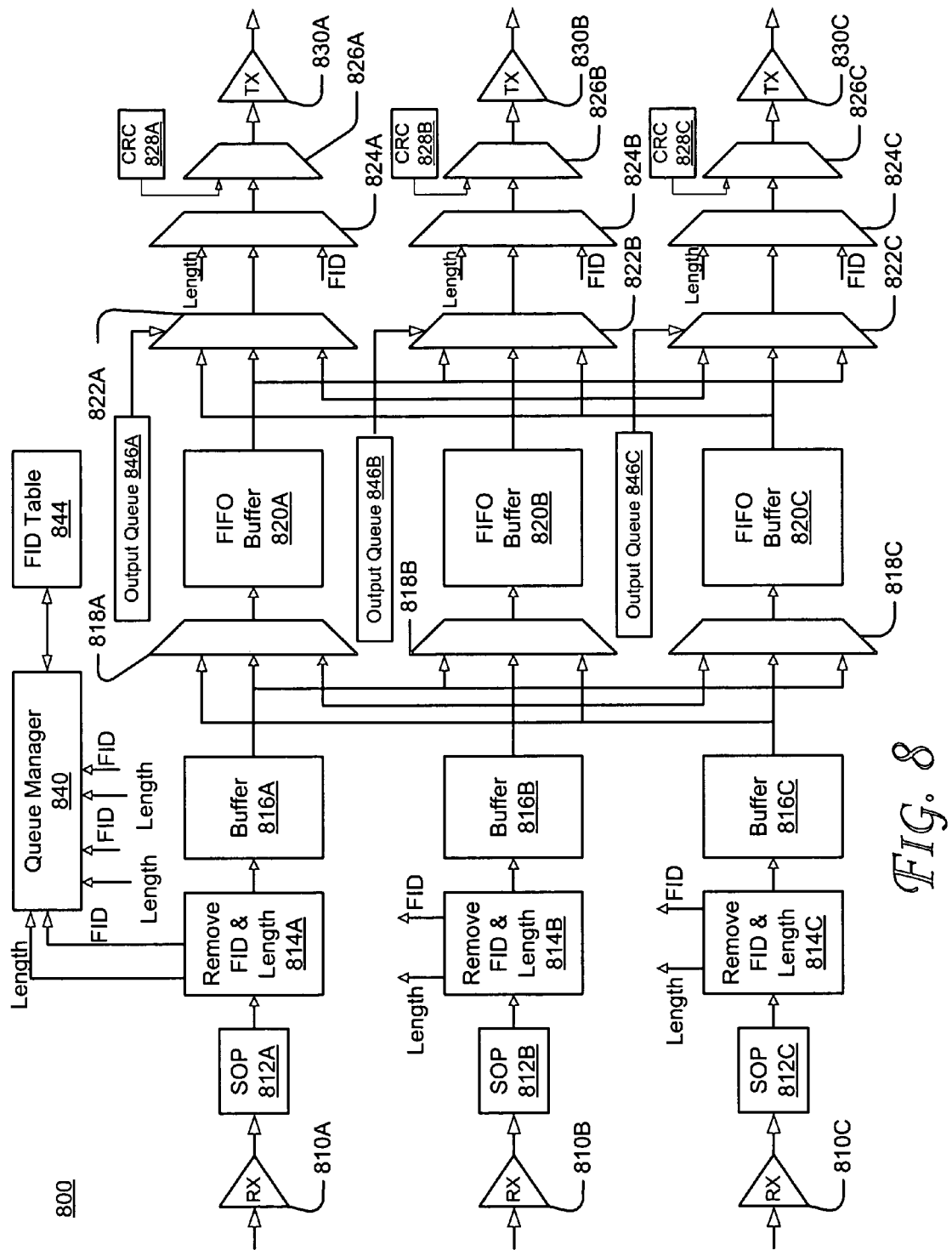
FIG. 8 is a schematic illustration of logical components of a switch fabric in accordance with an embodiment.
Figure 9:
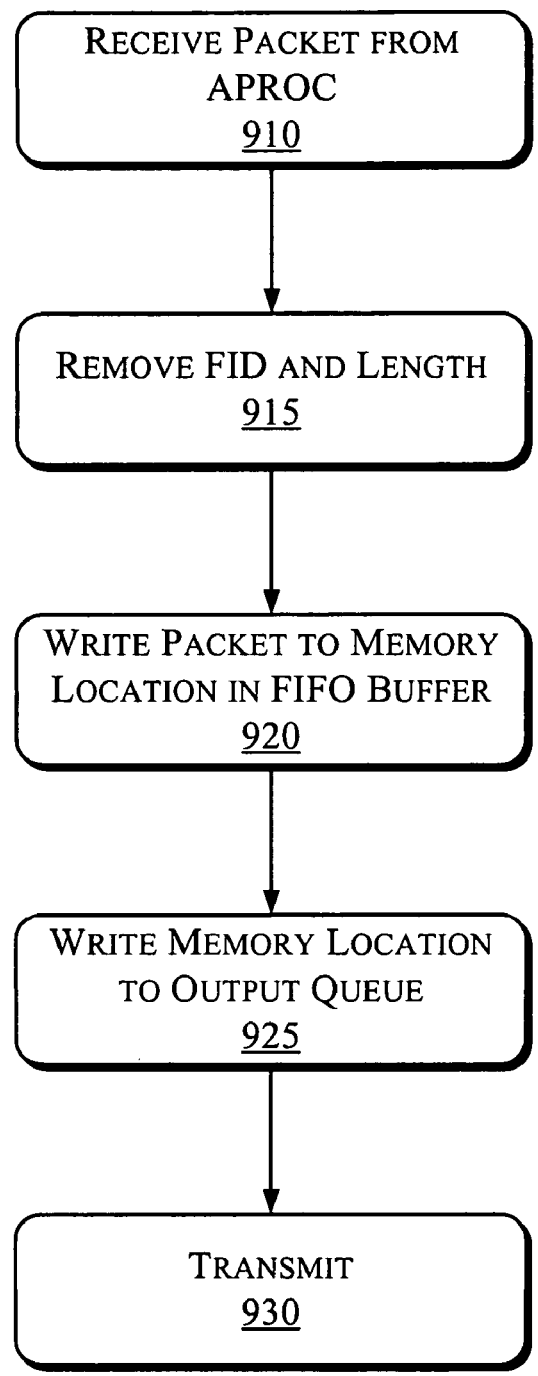
FIG. 9 is a flowchart illustrating operations in one embodiment of a method for processing data frames in accordance with an embodiment.

Referring back to FIG. 1, data transmitted from the adaptation processors 128A, 128B traverses the SERDES interface to switch fabric 150A, 150B. Structural details and operations of switch fabric 150A, 150B will be explained in greater detail with reference to FIGS. 8 and 9. FIG. 8 is a schematic illustration of logical components of a switch fabric in accordance with an embodiment, and FIG. 9 is a flowchart illustrating operations in one embodiment of a method for reading data frames from a memory. In one embodiment, switch fabric 800 may correspond to one or more of the switch fabric 250A, 250B.

Referring to FIG. 8, switch fabric 800 includes a plurality of receivers 810A, 810B, 810C to receive inputs from, e.g., adaptation processors 128A, 128B, etc. (operation 910). The embodiment depicted in FIG. 8 includes three receivers, but switch fabric 800 may include more or fewer receivers. Receivers 810A, 810B, 810C may include an input/output (I/O) port. Start of packet (SOP) detectors 812A, 812B, 812C are coupled to receivers 810A, 810B, 810C. Output from the SOP detectors 812A, 812B, 812C are directed to modules 814A, 814B, 814C to remove the FID 325A and the length parameter 330A from the received packet (operation 915). The FID 325A and the length parameter 330A may be input to the queue manager 840. In one embodiment, the packets may be buffered temporarily in buffers 816A, 816B, 816C.

Output from buffers 816A, 816B, 816C are directed to a multiplexer tree comprising multiplexers 818A, 818B, 818C, each of which are coupled to first-in-first-out (FIFO) buffer 820A, 820B, 820C. In one embodiment, FIFO buffers 820A, 820B, 820C may be implemented as logical blocks of a single block of physical memory. The output of the FIFO buffers 820A, 820B, 820C are directed to a multiplexer tree comprising multiplexers 822A, 822B, 822C. The outputs of multiplexers 822A, 822B, 822C are coupled to multiplexer 824A, 824B, 824C which are coupled to multiplexer 826A, 826B, 826C, which are coupled to transmitters 830A, 830B, 830C.

In operation, receivers 810A, 810B, 810C receive data flows from the APROCs 128A, 128B (operation 910). SOP detectors 812A, 812B, 812C monitor data flows in the receiver to detect a start of packet condition. In one embodiment the start of packet condition is indicated by an "11" in the data flow, as illustrated in FIG. 2. When a start of packet condition is detected, modules 814A, 814B, 814C remove the FID 325A and the length parameter 330A from the packet (operation 915). The FID 325A and the length parameter 330A are input to a queue manager 840. The data packets may be buffered temporarily in buffers 816A, 816B, 816C.

Queue manager 840 monitors: amount of memory available, the amount of memory consumed by each FIFO buffer 820A, 820B, 820C, and the amount of memory reserved by processes and generates control signals to control multiplexers 818A, 818B, 818C. Hence, queue manager 840 controls the flow of data into and out of FIFO buffers 820A, 820B, 820C and permits the memory available for FIFO buffers to be managed in an intelligent fashion.

Based on the control signal from queue manager 840, data packets output from buffers 816A, 816B, 816C are multiplexed into one of FIFO buffers 820A, 820B, 820C (operation 920). FID table 844 records the location of the data packets in FIFO buffers 820A, 820B, 820C, and writes the memory location to an output queue 846A, 846B, 846C once the packet has been received. Signals from the output queues 846A, 846B, 846C control multiplexers 822A, 822B, 822C, respectively, to multiplex data packets out of the FIFO buffers 820A, 820B, 820C.

At multiplexers 824A, 824B, 824C data packets are recombined with their FID 325A and the length parameter 330A. A CRC 335A is calculated and appended to the data packet, which is then transmitted (operation 930) from transmitters 830A, 830B, 830C.

Referring back to FIG. 1, data packets transmitted from the switch fabric 800 traverses the SERDES interface to a line card, e.g., 110A, 110B, where they are received by adaptation processor 128A, 128B. Structural details and operations of adaptation processors 128A, 128B will be explained in greater detail with reference to FIGS. 5-6.

Figure 5:
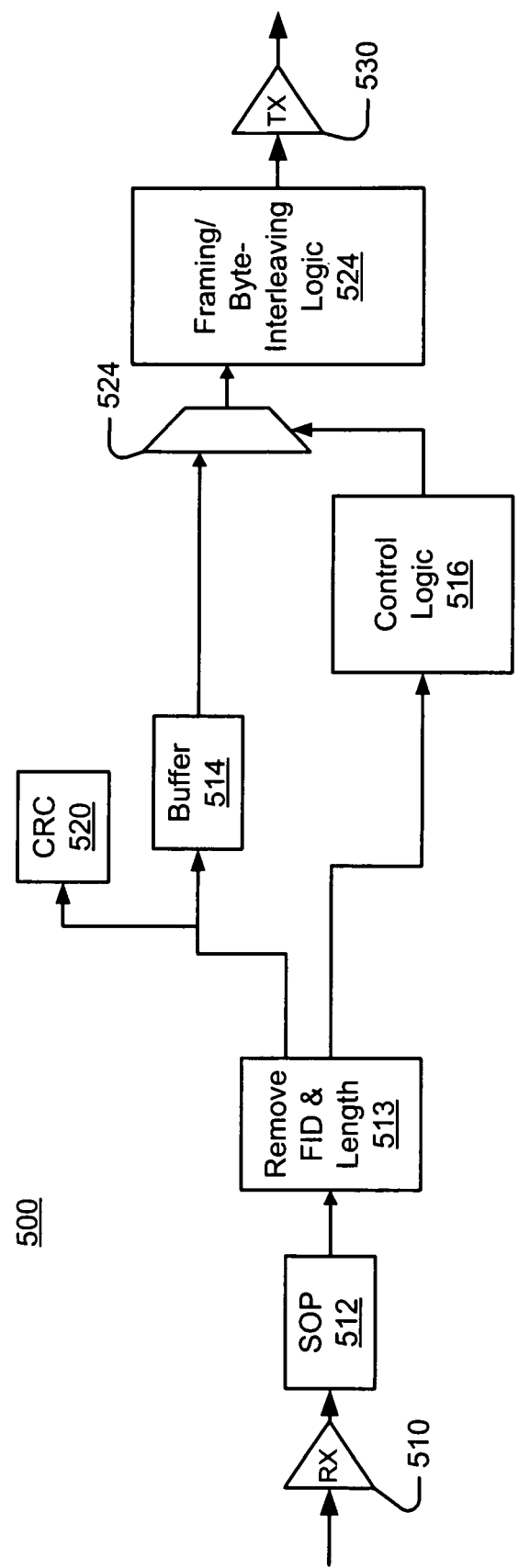
FIG. 5 is a schematic block diagram of egress logic of an adaptation processor adapted to operate in a TDM environment, in accordance with an embodiment.

FIG. 5 is a schematic block diagram of egress logic of an adaptation processor adapted to operate in a TDM environment, in accordance with an embodiment. In one embodiment, adaptation processor 500 may correspond to adaptation processor 128A.

Referring to FIG. 5, adaptation processor 500 includes a receiver 510 to receive data packets from a switch fabric. In on embodiment, receiver 510 includes an input/output port that receives data from a SERDES interface. A SOP detector 512 coupled to receiver 510 monitors data flows into receiver 510 to detect a start of packet condition. In one embodiment the start of packet condition is indicated by an "11" in the data flow, as illustrated in FIG. 4.

When a start of packet is detected, a module 513 extracts the FID 325A and the length parameter 320A from the received packet. The FID 325A is passed to the control logic 516, which uses the FID to correctly byte-interleave STS-1 payloads. The data packet may be buffered in a suitable memory buffer 514. As the data is being written to the buffer 514, a CRC module 520 calculates a CRC on the received data and generates a signal indicating whether there are any errors in the data. Errors may be recorded in a error register and may result in an interrupt generated to a processor.

The control logic generates a control signal to control multiplexer 524 to write data from buffer 514 into framing/ byte interleaving logic module 524, which performs frame alignment and pointer processing operations and byte-interleaves the data packet into a suitable framing structure such as, e.g., a SONET STS-N frame. The frame is then passed to transmitter 530 to be transmitted onto the network.

Figure 6:
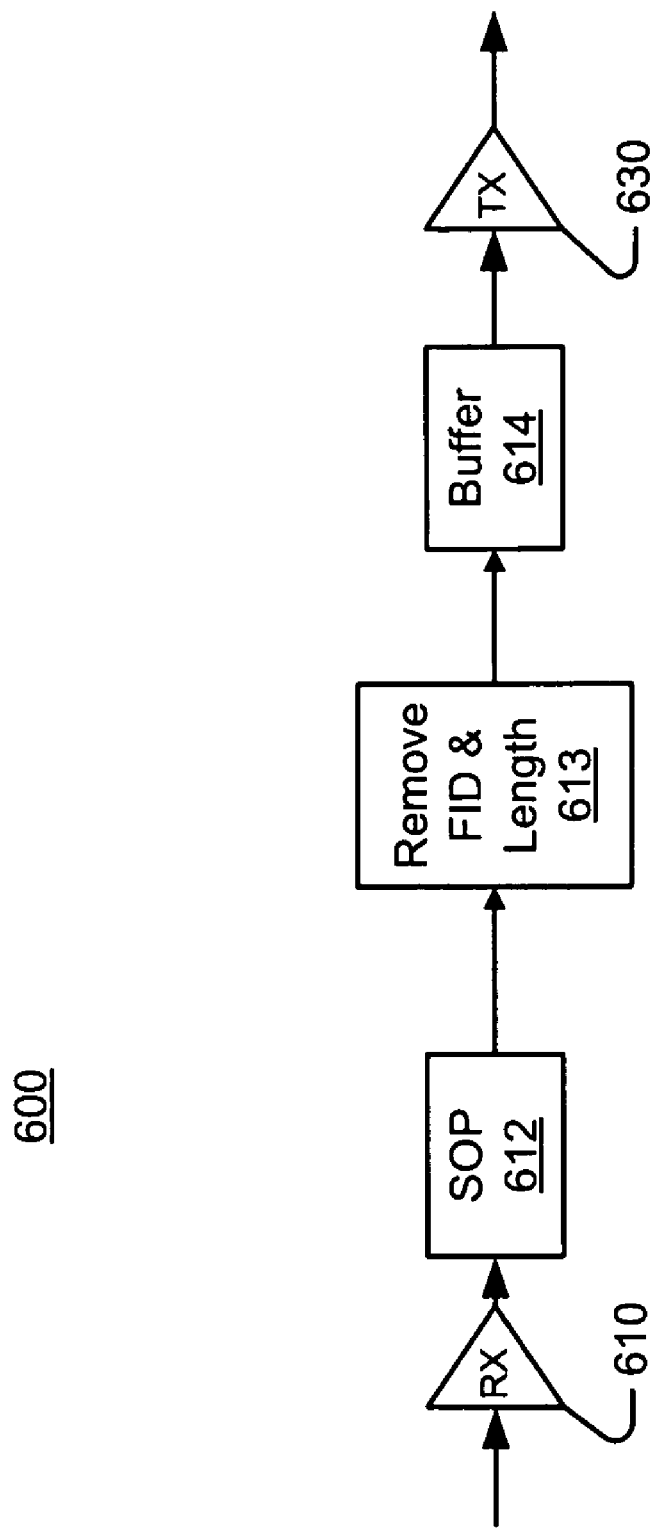
FIG. 6 is a schematic block diagram of egress logic of an adaptation processor adapted to operate in a packet-switched environment, in accordance with an embodiment.

FIG. 6 is a schematic block diagram of ingress logic of an adaptation processor adapted to operate in a packet-switched environment, in accordance with an embodiment. In one embodiment, adaptation processor 600 may correspond to adaptation processor 128B.

Referring to FIG. 6, adaptation processor 600 includes a receiver 610 to receive data packets from a switch fabric. In one embodiment, receiver 610 includes an input/output port that receives data from a SERDES interface. A SOP detector 612 coupled to receiver 610 monitors data flows into receiver 610 to detect a start of packet condition. In one embodiment the start of packet condition is indicated by an "11" in the data flow, as illustrated in FIG. 4.

When a start of packet is detected, a module 613 extracts the FID 325A and the length parameter 320A from the received packet. The packet may be stored temporarily in a buffer 614 and passed to transmitter 630 to be transmitted onto the network.

In one embodiment, the structure and operations of the adaptation processor and the switch fabric described herein permit a switch fabric to switch variable-sized packets, including both time-division-multiplex (TDM) packets and packet-switched packets.

In one embodiment, the communication interface between adaptation processor 128A, 128B and switch fabric 150A, 150B may include a backpressure signal. Traffic is automatically transmitted from the line card 110A to the switch fabric 150A unless a backpressure signal is asserted. In one embodiment the backpressure signal may be implemented as a binary signal. In alternate embodiments the backpressure signal may be implemented as a control signal that regulates the data transmission rate from the line card.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A computer-based apparatus for packet adaptation, comprising:
   a switch fabric;
   an adaptation processor to append a length field to a received packet;
   a framing/byte-interleaving module to interleave the packet into a timeslot in a framing structure; and
   a switch fabric to use information in the length field to switch variable-sized packets.

2. The apparatus of claim 1, wherein the adaptation processor assigns a flow identifier to the received packet.

3. The apparatus of claim 2, wherein:
   the switch fabric includes a flow identifier table; and
   the flow identifier table includes a pointer to a memory location associated with the switch fabric for the received packet.

4. The apparatus of claim 3, wherein the switch fabric writes the memory location to an output queue associated with an output port.

5. The apparatus of claim 1, wherein the adaptation processor is coupled to the switch fabric via a request-less interface.

6. The apparatus of claim 1, wherein the adaptation processor comprises a flow manager module to assign a priority to the received packet.

7. A computer-based method for packet adaptation, comprising:
   receiving a packet into a processor;
   appending a length field to the packet;
   appending a flow identifier to the packet;
   byte-interleaving the packet into a timeslot in a framing structure' and
   transmitting the packet to a switch fabric.

8. The method of claim 7, further comprising:
   receiving the packet in the switch fabric; and
   using the flow id entifier to select a location in memory to store the packet.

9. The method of claim 8, further comprising writing the packet to the memory location.

10. The method of claim 9, further comprising writing the memory location to an output port associated with the switch fabric.

11. The method of claim 10, further comprising switching the packet to the output port.

12. The method of claim 7, wherein the length field identifies the length of the payload section of the data packet.

13. A computer-based method of packet adaptation, comprising:
   receiving a packet into an adaptation processor;
   retrieving a flow identifier from the packet;
   selecting an output port using the flow identifier; and
   mapping the packet to the output port; and
   byte-interleaving the packet into a timeslot in a framing structure.

14. The method of claim 13, further comprising performing an error check operation on the received packet.

15. The method of claim 13, further comprising transmitting the packet.

16. A computer-based system for packet adaptation, comprising:
   a first line card;
   a backplane interface;
   a second line card communicatively coupled to the first line card via the backplane interface and comprising a processor capable to append a length field to a received packet;
   a framing/byte-interleaving module to interleave the packet into a timeslot in a framing structure;
   a switch fabric to use information in the length field to switch variable-sized packets.

17. The system of claim 16, wherein the backplane interface operates using a request-less communication protocol.

18. The system of claim 16, wherein the second line card further comprises an adaptation processor assigns a flow identifier to the received packet.

19. The apparatus of claim 16, wherein:
   the switch fabric includes a flow identifier table; and
   the flow identifier table includes a pointer to a memory location associated with the switch fabric for the received packet.

20. The apparatus of claim 16, wherein the switch fabric includes a queue manager to manage a memory module in the switch fabric.

21. The apparatus of claim 20, wherein the queue manager regulates traffic flow through the switch fabric.

* * * * *